(12) United States Patent
Lee et al.

(10) Patent No.: US 9,727,124 B2
(45) Date of Patent: Aug. 8, 2017

(54) POWER SAVING APPLICATION UPDATE IN A PORTABLE ELECTRONIC DEVICE

(75) Inventors: Jae Han Lee, San Jose, CA (US); Shaohai Chen, Cupertino, CA (US); Phillip George Tamchina, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 517 days.

(21) Appl. No.: 13/090,007

(22) Filed: Apr. 19, 2011

(65) Prior Publication Data

US 2012/0272230 A1    Oct. 25, 2012

(51) Int. Cl.
| G06F 1/32 | (2006.01) |
| H04M 1/67 | (2006.01) |
| H04M 1/725 | (2006.01) |
| H04W 4/18 | (2009.01) |
| H04W 52/02 | (2009.01) |

(Continued)

(52) U.S. Cl.
CPC .............. *G06F 1/329* (2013.01); *G06F 8/65* (2013.01); *H04L 67/1095* (2013.01); *H04L 67/32* (2013.01); *H04M 1/67* (2013.01); *H04M 1/72566* (2013.01); *H04W 4/18* (2013.01); *H04W 52/027* (2013.01); *H04W 52/0258* (2013.01); *Y02B 60/144* (2013.01);
(Continued)

(58) Field of Classification Search
None
See application file for complete search history.

(56) References Cited

U.S. PATENT DOCUMENTS

| 6,631,469 B1 * | 10/2003 | Silvester ............... G06F 1/3228 713/2 |
| 7,130,920 B1 * | 10/2006 | Sailor ..................... H04L 67/32 370/218 |

(Continued)

FOREIGN PATENT DOCUMENTS

| CN | 101321333 | 12/2008 |
| EP | 1962473 A1 | 8/2008 |

(Continued)

OTHER PUBLICATIONS

Rozner et al., "NAPman: network-assisted power management for wifi devices," 2010, Proceedings of the 8th international conference on Mobile systems, applications, and services, pp. 91-106, retreived on Mar. 29, 2017 from <url>:http://http://dl.acm.org/.*

(Continued)

*Primary Examiner* — Thuy Dao
*Assistant Examiner* — Stephen Berman
(74) *Attorney, Agent, or Firm* — Sterne, Kessler, Goldstein & Fox PLLC

(57) ABSTRACT

A power savings mode for data updates is provided. The power savings mode prevents data updates to occur while a screen of a portable electronic device is turned off and the device is in a sleep state. The power savings mode waits until the screen is turned on and the portable electronic device is in a wake state before allowing applications and widgets to update data from network repositories. By preventing applications and widgets from updating data while the portable electronic device is in a sleep state, the power savings mode conserves battery life and network bandwidth by limiting possibly unnecessary data transmissions.

21 Claims, 11 Drawing Sheets

(51) Int. Cl.
*H04L 29/08* (2006.01)
*G06F 9/445* (2006.01)

(52) U.S. Cl.
CPC ............. *Y02B 60/183* (2013.01); *Y02B 60/46* (2013.01); *Y02B 60/50* (2013.01)

(56) References Cited

U.S. PATENT DOCUMENTS

| | | | |
|---|---|---|---|
| 7,779,402 B2* | 8/2010 | Abernethy et al. | 717/168 |
| 7,843,427 B2 | 11/2010 | Ording et al. | |
| 8,434,153 B2* | 4/2013 | Sundaramurthy et al. | 726/26 |
| 8,774,767 B2 | 7/2014 | Yoo et al. | |
| 9,152,208 B2 | 10/2015 | Tanskanen et al. | |
| 2006/0036878 A1* | 2/2006 | Rothman | G06F 1/329 713/300 |
| 2006/0166663 A1 | 7/2006 | Haehnichen et al. | |
| 2007/0006214 A1* | 1/2007 | Dubal | G06F 8/65 717/171 |
| 2008/0052701 A1* | 2/2008 | Abernethy et al. | 717/170 |
| 2008/0082930 A1 | 4/2008 | Omernick et al. | |
| 2008/0154805 A1* | 6/2008 | Gurumoorthy | G06F 9/505 706/12 |
| 2008/0263375 A1 | 10/2008 | Sundstrom et al. | |
| 2009/0241103 A1* | 9/2009 | Pennisi | G06F 8/65 717/173 |
| 2009/0249321 A1* | 10/2009 | Mandyam et al. | 717/171 |
| 2009/0259691 A1* | 10/2009 | Tanskanen et al. | 707/200 |
| 2010/0056272 A1* | 3/2010 | Dutilly | G06F 1/329 463/30 |
| 2010/0235746 A1 | 9/2010 | Anzures | |
| 2010/0248688 A1 | 9/2010 | Teng et al. | |
| 2010/0323726 A1* | 12/2010 | Wang | H04L 67/32 455/466 |
| 2011/0002343 A1 | 1/2011 | Dacosta | |
| 2011/0047368 A1* | 2/2011 | Sundaramurthy et al. | 713/100 |
| 2011/0081889 A1 | 4/2011 | Gao et al. | |
| 2011/0209133 A1* | 8/2011 | Mahajan et al. | 717/170 |
| 2012/0108166 A1* | 5/2012 | Hymel | 455/26.1 |
| 2012/0210325 A1* | 8/2012 | de Lind van Wijngaarden et al. | 718/103 |

FOREIGN PATENT DOCUMENTS

| | | |
|---|---|---|
| JP | S63-032636 A | 2/1988 |
| JP | 2010-061394 A | 3/2010 |
| JP | 2010-061503 A | 3/2010 |
| WO | WO 2009/120597 A | 10/2009 |
| WO | WO-2009125054 | 10/2009 |
| WO | WO-2009148472 | 12/2009 |

OTHER PUBLICATIONS

Wu et al "Energy-Efficient Wake-Up Scheduling for Data Collection and Aggregation," 2010, IEEE Transactions on Parallel and Distributed Systems, vol. 21, Issue: 2, pp. 275-287, retreived on Mar. 29, 2017 from <url>:http://http://http://ieeexplore.ieee.org/.*

Aggarwal et al., "Stratus: energy-efficient mobile communication using cloud support," 2010, SIGCOMM '10 Proceedings of the ACM SIGCOMM 2010 conference, pp. 477-478, retreived on Mar. 29, 2017 from <url>:http://http://dl.acm.org/.*

Apple Inc., PCT Search Report and Written Opinion mailed Jun. 20, 2012, PCT Apln. No. PCT/US2012/032296 filed Apr. 5, 2012, 14 pages.

Linder, Brad, "Add widgets to your Android Lock Screen with FlyScreen", mobiputing.com, Retrieved from Internet: http://mobiputing.com/2010/03/add-widgets-to-your-android-lock-screen-with-flyscreen, (Mar. 11, 2010), 4 pages.

Chinese Search Report directed to related Chinese Patent Application 201280019000.5; mailed May 18, 2015; 1 pages.

English Language Abstract to Japanese Patent Publication No. 2010-061503 A, published Mar. 18, 2010; 2 pages.

International Search Report directed to related PCT Patent Appl. No. PCT/US2012/032296, mailed Jun. 20, 2012; 3 pages.

International Preliminary Report on Patentability directed to related PCT Patent Appl. No. PCT/US2012/032296, dated Oct. 22, 2013; 10 pages.

English Language Abstract to Japanese Patent Publication No. S6332636 A, published Feb. 12, 1988; 2 pages.

English Language Abstract to Japanese Patent Publication No. 2010-061394 A, published Mar. 18, 2010; 2 pages.

Search Report with translation by Registered Search Organization directed to related Japanese Patent Application No. 2014-506440 A, dated Nov. 20, 2014; 59 pages.

Written Opinion with translation directed to related Korean Patent Application No. 10-2013-7030285, mailed Jan. 28, 2015; 10 pages.

* cited by examiner

POWER SAVING APPLICATION UPDATE IN A PORTABLE ELECTRONIC DEVICE

BACKGROUND

An embodiment of the invention generally relates to a power saving system and method for updating data in an application or widget running on a portable electronic device. Other embodiments are also described.

Portable electronic devices receive and display numerous pieces of information to users. The information may be received through the Internet or any type of data network. Conventionally, users have retrieved and viewed information from data networks through websites formatted for web browsers. However, websites are often difficult to view on smaller screens typically used on portable electronic devices. Accordingly, special purpose applications have been developed for portable electronic devices that properly format information typically viewed on a website for use on a portable electronic device's small screen. In some cases, these special purpose applications may fully encompass the viewing area of the screen such that a user can only view the contents of one active application. However, in other cases special purpose applications may be sized to encompass only a small area of a screen such that multiple applications may be viewed simultaneously. These smaller footprint applications are sometimes referred to as "widgets."

Whether using a web-browser to view information or a special purpose application, these applications receive information through a network interface using either a push or pull protocol. For example, a portable electronic device with Internet connectivity may retrieve weather information for a user's hometown from a weather broadcast service, such as The Weather Channel (www.weather.com), The National Weather Service (www.weather.gov), AccuWeather (www.accuweather.com), or a similar service. Upon receipt, the information is shown to a user on a screen of the portable electronic device through a visible user interface provided by a weather application.

In many cases, the constant changing of information results in the need to periodically update the data that is shown by the application. For example, a weather application may be configured to automatically retrieve and update its displayed data every hour. These updates take place even while the screen of the portable electronic device is shut off such that the weather application is not viewable to a user. In some instances, data displayed in the application may be refreshed several times before the screen of the portable electronic device is turned on and viewed by a user. Each unviewed data update thus consumes battery power and network bandwidth, without providing a benefit to the user since the results were never viewed.

SUMMARY

Many portable electronic devices include various applications and widgets that rely on periodically obtaining data from remote network repositories. After The updated data is typically shown to a user on a screen of the portable electronic device only when the screen has been turned on and the device has exited a sleep state. There is a need for a power saving mode that efficiently controls the update of such data.

An embodiment of the invention provides a power savings mode for data updates. The power savings mode prevents data updates from taking place, while a screen of the portable electronic device is turned off and the device is in a sleep state. In one embodiment, the power savings mode waits until the screen is turned on and the portable electronic device is in a wake state, before allowing a given application or widget to update data from network repositories. In another embodiment, the power savings mode prevents a given application or widget from updating its data while the device is in its sleep state, until a predetermined user command is detected or received, e.g. a physical home button being pressed, an audible pattern being recognized (using a microphone), or a movement pattern being recognized (using a position, orientation or movement sensor). By preventing the application or widget from updating data while the portable electronic device is in a sleep state, the power savings mode may conserve battery energy and network bandwidth by limiting possibly unnecessary network data transmissions.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now explained. While numerous details are set forth, it is understood that some embodiments of the invention may be practiced without these details. In other instances, well-known circuits, structures, and techniques have not been shown in detail so as not to obscure the understanding of this description.

Figure 1A:
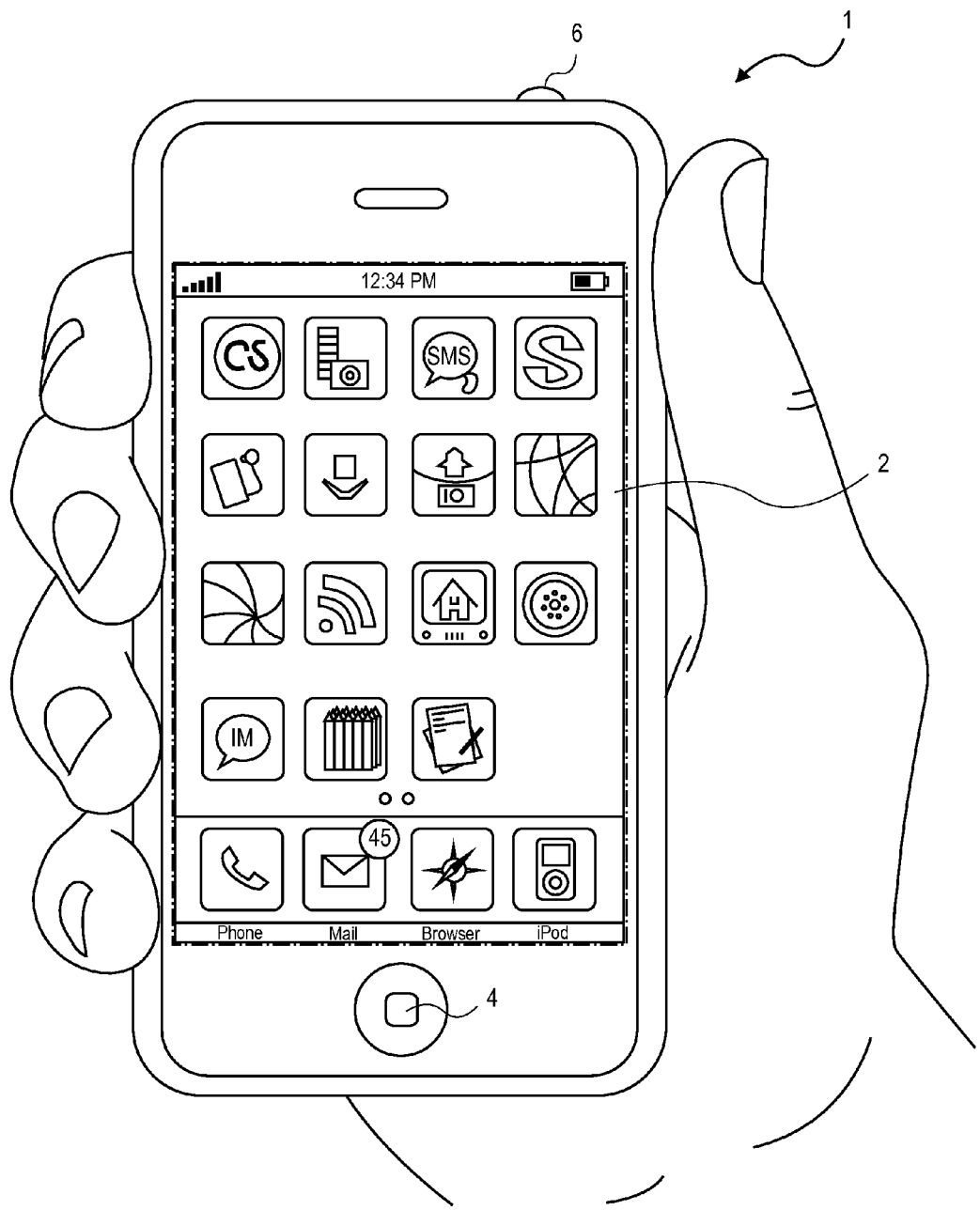
FIG. 1a shows a portable electronic device running an operating system and one or more applications or widgets, in accordance with an embodiment of the invention.

FIG. 1a shows a portable electronic device 1 that is running an operating system and one or more applications or widgets. The portable electronic device 1 may be a personal digital assistant, a smart phone, a portable audio device, or any similar apparatus. For example, the portable electronic device 1 may be an iPhone™ device, an iPad™ device or an iPod™ device by Apple Inc. of Cupertino, Calif. The portable electronic device 1 includes a display screen 2, a home menu button 4, and a power on/off button 6. In one embodiment, the display screen 2 may be a touch screen, which can detect the presence and location of a touch within the display screen 2, which may be used for essentially all user input. In other embodiments, a physical QWERTY keypad is provided for the user input. The device 1 may also include audio volume buttons and a call ringer on/off button. An example home menu of a graphical user interface is shown in FIG. 1, with graphic icons representing various applications stored in the device 1 and that can be executed therein.

The display screen 2 displays graphics and text output by applications, widgets, and the operating system running on the portable electronic device 1. The term "application" is used generically here to encompass both full-featured applications and apps, which typically take up the entire display screen of a smart phone device when opened, and widgets which are miniature programs that have much more limited functionality and can "reside" a lock screen of the device while displaying data that is being periodically updated. A widget can also be an interactive portal to its parent app. Examples include a clock widget, a calendar widget, a stock ticker widget, and a weather widget. Multiple applications may be viewable on the display screen 2 at a single time, or a single application may be expanded to the entire viewing area of the display screen 2.

The device 1 includes the necessary hardware and software to manage turning on and off the display screen 2 and the sleep and wake modes of the device, to enable efficient use of the device's battery (not shown). The display screen 2 is turned off when the portable electronic device 1 enters the sleep state while the display screen 2 is turned on when the portable electronic device 1 exits the sleep state and enters a wake state. The home button 4 may be used to turn the display screen 2 on (i.e. transition the device 1 from a sleep state to a wake state). The power button 6 may be used to toggle the display screen 2 on and off (i.e. transition the device 1 between wake and sleep states) and to toggle the entire device 1 on and off (i.e. force a power on reset and completely power down the device 1). For example, when the display screen 2 is on (e.g. lit and in a wake state), pressing the power button 6 for a short duration (e.g. holding it for no more than 1 second) may toggle the display screen 2 off (e.g. unlit and in a sleep state) but not completely power down the device 1. In one embodiment, when the display screen 2 is off, all touch sensitive controls on the display screen 2 are disabled. While the portable electronic device 1 can still receive data, phone calls and play music/audio when the display screen 2 is off and the device 1 is in a sleep state, user input via the display screen 2 is disabled. Additionally, pressing the power button 6 for a short duration while the display screen 2 is turned off turns the display screen 2 on and the touch sensitivity of the display screen 2 is reactivated.

As noted above, the power button 6 may also be used to toggle power to the entire device 1. For example, when powered on in either a sleep or wake state, holding the power button 6 down for a relatively long duration, e.g. more than 1 second, powers down the device 1 completely. When powered down, the device 1 cannot transmit or receive data, initiate or answer phone calls, process any data, etc. When the device 1 is powered off, holding the power button 6 down for a relatively long duration causes a power-on-reset for the entire device 1.

Similar to the power button 6, the home button 4 may be configured to toggle the device 1 from sleep state to wake state, when pressed for essentially any duration.

The portable electronic device 1 includes an operating system that manages hardware resources and provides common services to various applications running on the operating system. For example, the operating system installed on the portable electronic device 1 may manage memory allocation, network interfaces, audio circuitry, and external interfaces. Example operating systems include iOS by Apple Inc. and Symbian by Nokia.

Figure 1B:
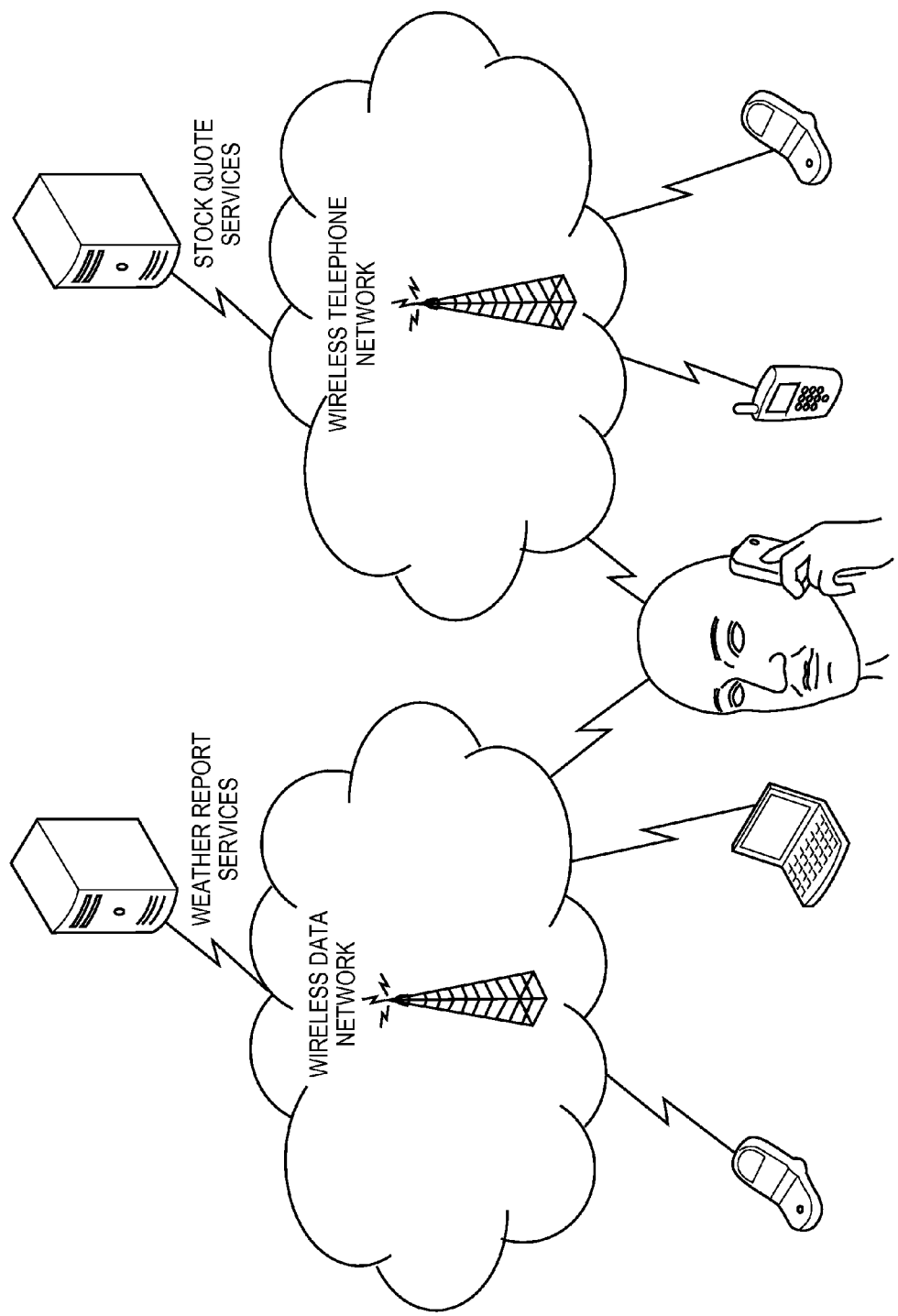
FIG. 1b shows a portable electronic device connected to a wireless data network and a wireless telephone network, in accordance with an embodiment of the invention.

With the assistance of the installed operating system, the device 1 supports a variety of applications, such as a telephone application for receiving/placing phone calls, a lock screen application, a weather widget, a stock quote widget, a blogging widget, a web browser application, etc. An application running on the portable electronic device 1 may access a network interface through a system call to the installed operating system. The network interface provides the applications with access to networks and external sources of data using a variety of communications standards, protocols, and technologies as introduced above. For example, as shown in FIG. 1b, the portable electronic device 1 may include network interfaces that allow the device 1 to connect to both wireless data networks and wireless telephone networks to access weather report and stock quote services.

Figure 2:
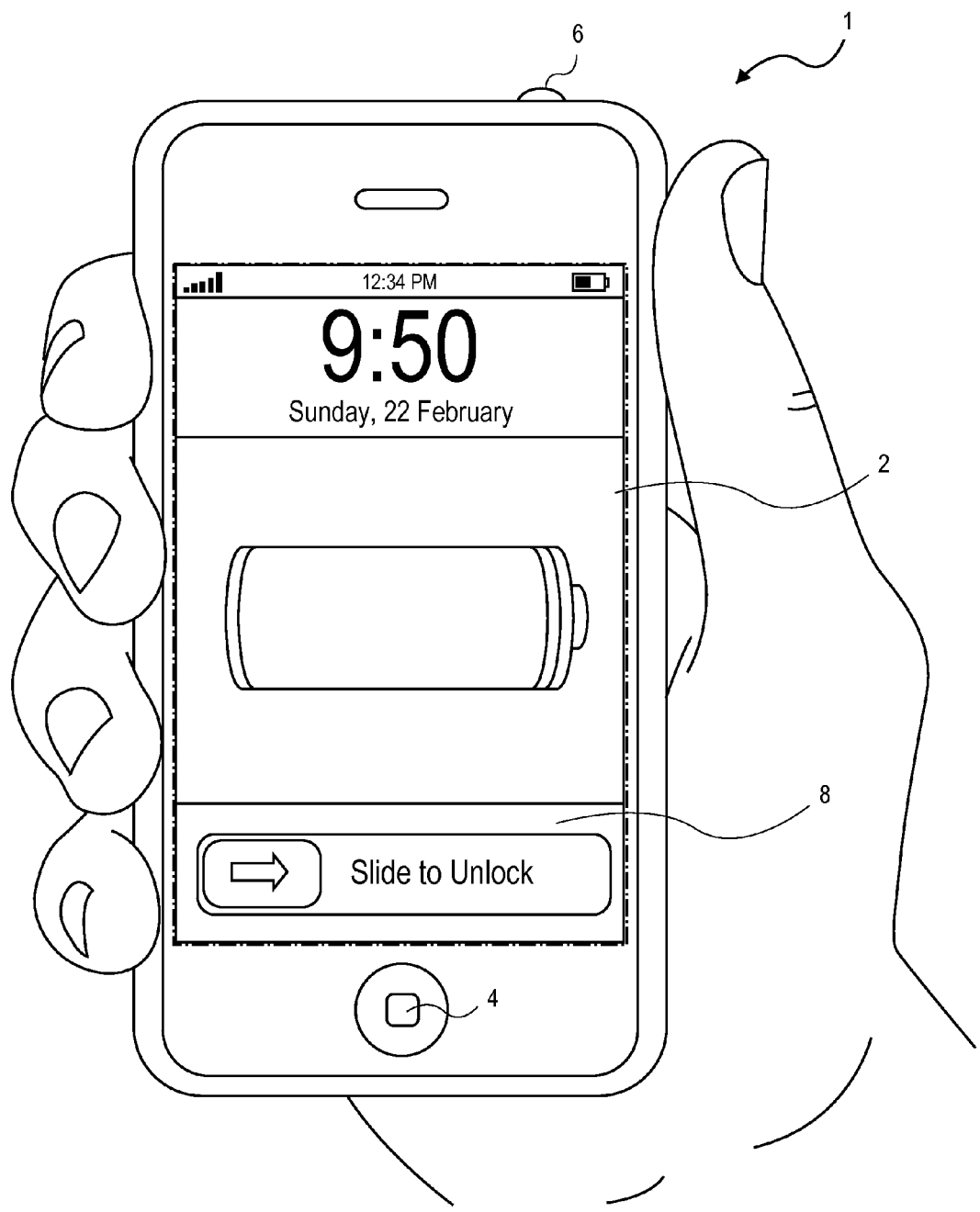
FIG. 2 shows a lock screen application running on the portable electronic device while the portable electronic device 1 is in a wake state.

FIG. 2 shows an "unlock screen" of a lock screen application running on the portable electronic device 1 in a wake state. The display screen 2 is turned on, and the user is being prompted to unlock or enable the user interface of the device 1. The lock screen application may be a standalone application that runs on top of the operating system, or the lock screen application may be a service that is integrated as part of the operating system.

The lock screen application prevents unauthorized access or inadvertent use of the portable electronic device 1. As shown in FIG. 2, with the assistance of the lock screen application, the user interface of the portable electronic device 1 is maintained in a locked state until the user "manually" commands the application to unlock the device 1. In the locked state, the unlock screen contains a graphic that prompts the user to slide a finger over a predetermined path on the display screen 2 to unlock the device 1. In other embodiments, the user may be directed to enter an alphanumeric code or other pattern (e.g. a movement pattern) to unlock the device 1. Note that there may be a password prompt after a physical button has been pressed but before the device 1 is "unlocked", requiring the user to enter a secret password before the user interface of the device 1 can be normally used in its wake state.

In the locked state, the lock screen may display various pieces of data to the user. For instance, in FIG. 2, time of day, date, data rate, and battery status are shown. The information may instead or in addition include the number of missed calls, the number of unread SMS and/or MMS messages, the number of unheard voicemail messages, etc. In one embodiment, one or more widgets may be "placed on the lock screen", such as a weather widget or a stock ticker widget. These may display data that is periodically updated (also referred to as dynamic content) from external sources. In one embodiment, these external sources are accessed through a network interface of the portable electronic device.

Figure 3A:
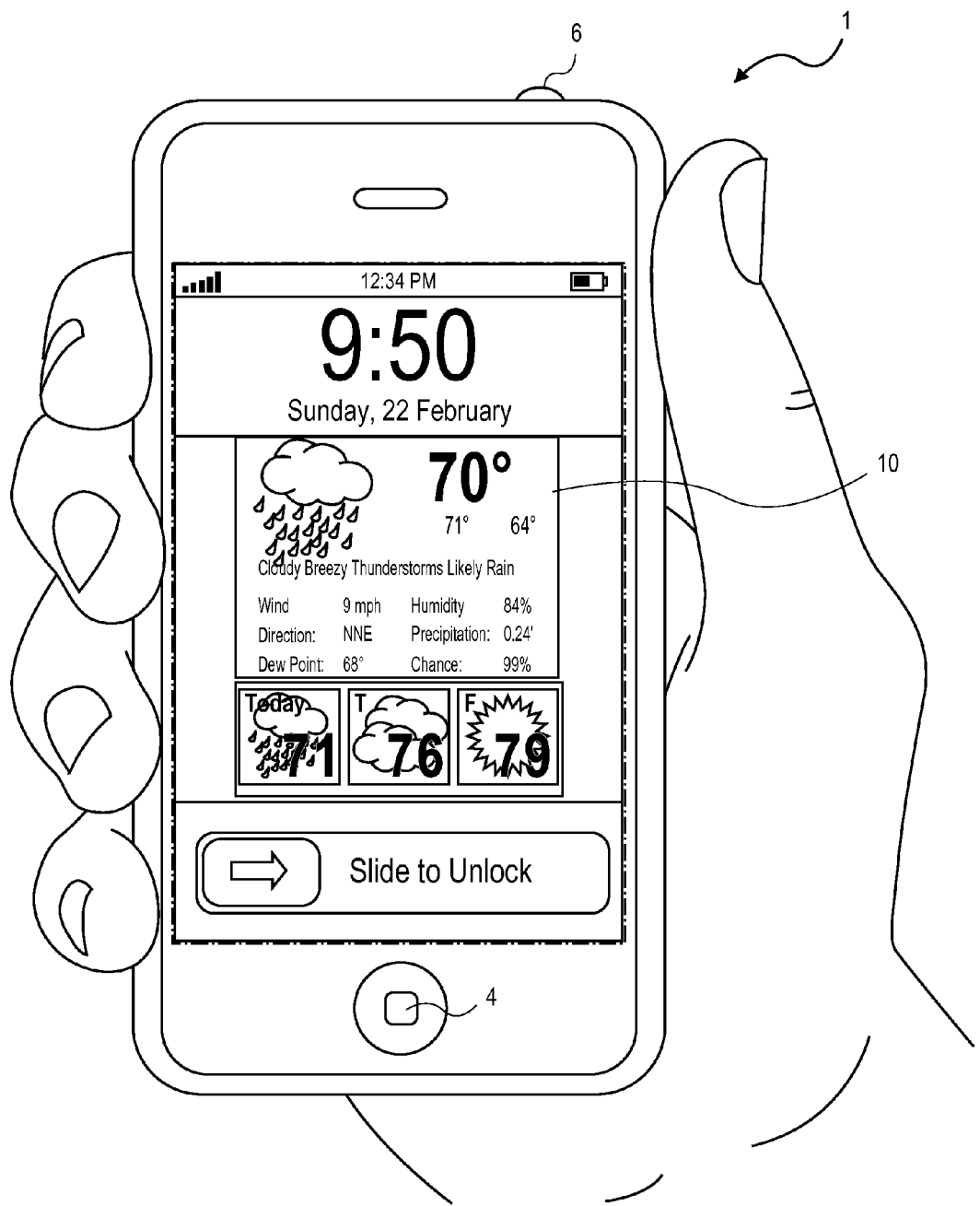
FIG. 3a shows the portable electronic device running a lock screen application and a weather widget in a wake state.

FIG. 3a shows the portable electronic device 1 running a lock screen application in a wake state. The lock or unlock screen being displayed in this example includes a weather widget 10 that is positioned at a center portion of the lock screen. Although a weather widget 10 is shown and described, any other similar type of widget (e.g. a stock widget that displays up to date stock price data or news relating to a particular stock, a sports widget that displays up to date score data or professional sports news, a blog widget that displays the latest posts made to a particular blog, etc.) may be used. The use of the weather widget 10 is merely for purposes of explanation.

The weather widget 10 shows the current weather for a location designated by the user. For example, the weather widget 10 may show the current temperature, wind direction, wind speed, barometric pressure, humidity, and other similar pieces of data for a designated city or location. The weather widget 10 may retrieve this weather data from an external data source through a network interface using either a push or pull protocol. For example, the external source may be a weather broadcast service or server that is accessible over the Internet, such as The Weather Channel (www.weather.com), The National Weather Service (www.weather.gov), AccuWeather (www.accuweather.com), or a similar service. To access such a server over the Internet, the weather widget 10 utilizes an appropriate network interface of the portable electronic device such as a WiFi wireless local area network interface, and various cellular network interfaces such as a GSM network interface, an EDGE network interface, a HSDPA network interface, a W-CDMA network interface, a CDMA network interface, or a TDMA network interface.

Figure 3B:
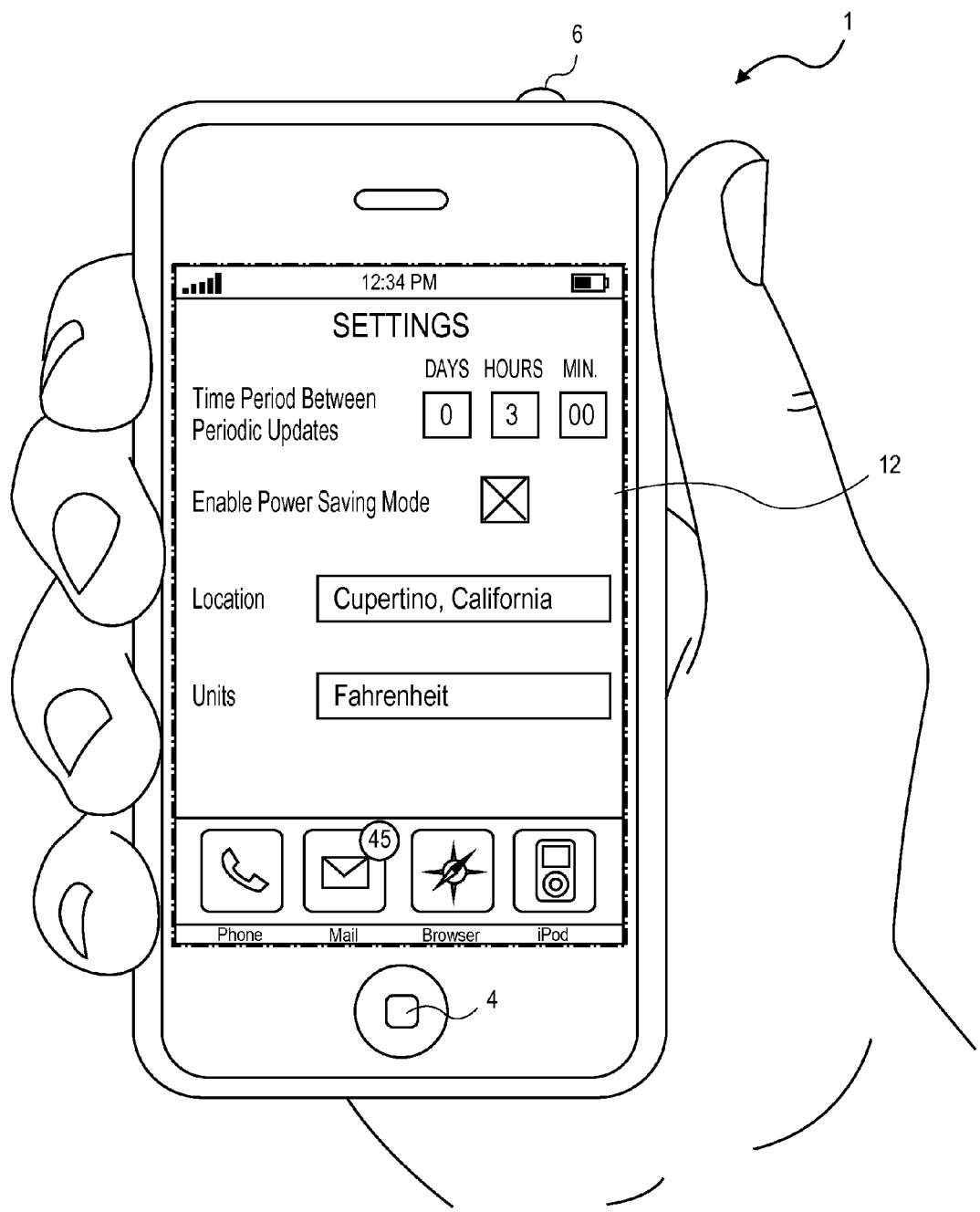
FIG. 3b shows a configuration panel for a weather widget, in accordance with an embodiment of the invention.

FIG. 3b shows a configuration panel 12 that is being displayed once the user interface of the device 1 has been unlocked for the weather widget 10. The configuration panel 12 allows the user to select various settings for the weather widget 10. In one of the settings, the user may select a time period between periodic updates of weather data. A time period between periodic updates may be set to a desired number of minutes, hours, or days. Since, weather conditions are not rapidly changing, this level of granularity is sufficient. However, other widgets may require a greater frequency of updates. For example, for a stock quotes widget it may be necessary to adjust periodic updates in terms of seconds, because stock quotes/prices change extremely rapidly.

FIG. 3b also shows a configuration setting for activating/deactivating of a power saving mode. The power saving mode regulates when the weather widget 10 updates data. In one embodiment, when activated, the power saving mode restricts the weather widget 10 from downloading data while the portable electronic device is in a sleep state (e.g. the display screen is off). Accordingly, any periodic updates that are scheduled to occur while the portable electronic device 1 is in the sleep state are not performed until the portable electronic device 1 transitions from the sleep state to a wake state.

Although the above description refers to a widget appearing on a lock screen of the portable electronic device 1, a stand-alone full-featured application running on the portable electronic device 1, but that does not have a corresponding widget appearing in the lock screen, may also be configured with the power saving mode as described herein. For example, a stand-alone stock application may be running on the portable electronic device 1 in a power saving mode. While the portable electronic device 1 is in a sleep state, the stand-alone stock application is not allowed to update data from an external data source using the network interface. All such scheduled data updates wait for the portable electronic device 1 to enter a wake state before being performed.

Figure 4:
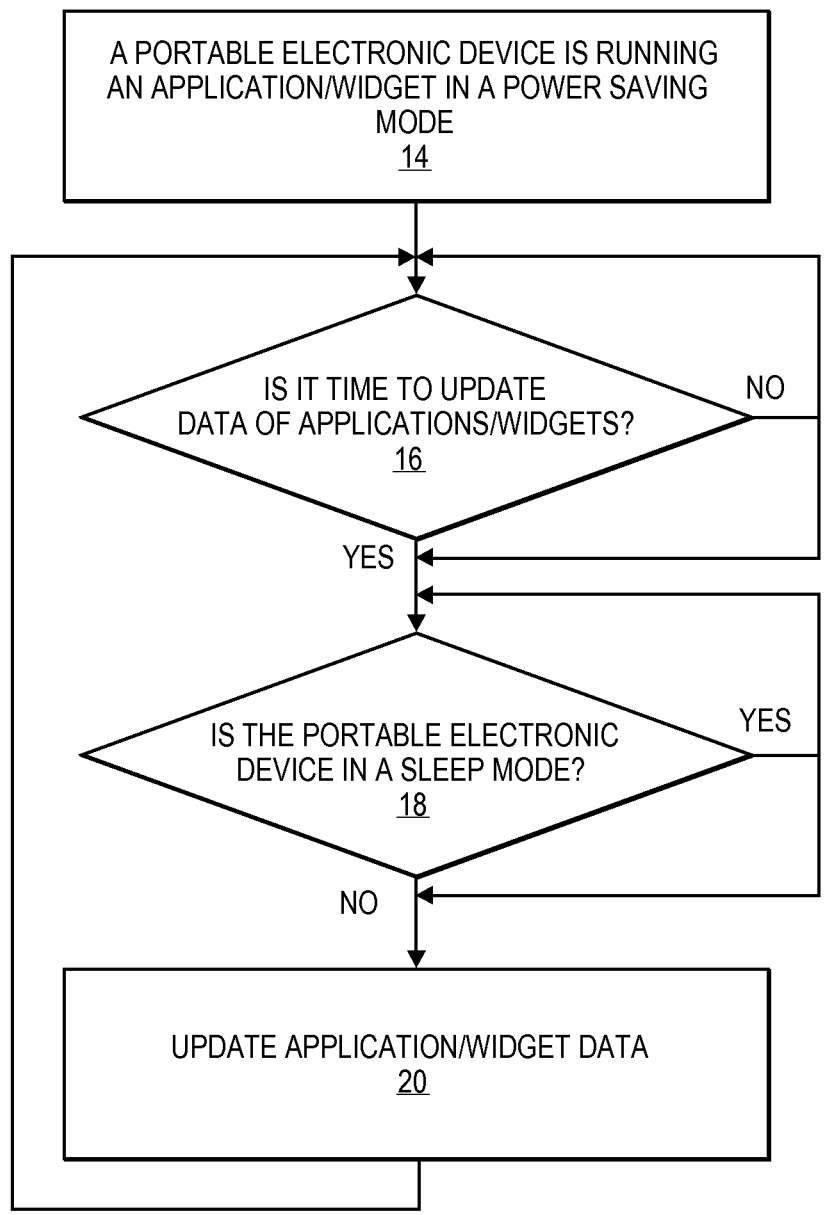
FIG. 4 shows a method for updating data on the portable electronic device using a power saving mode, in accordance with an embodiment of the invention.

FIG. 4 shows a method for updating application data on the portable electronic device 1 while operating in a power saving mode, according to one embodiment of the invention. An application may store the time of its next scheduled data update. At operation 14, the process begins when a power saving mode for the application has been selected. Selection of the power saving mode may be universal, that is for all applications running on the portable electronic device 1, using a user configurable setting provided by the operating system. In this embodiment, upon selection of the power saving mode, the operating system may create and update a database with the next scheduled data update of each active application. Alternatively, an application may be individually set to operate in the power saving mode, using a configurable setting provided by the application.

After selecting a power saving mode, the method of FIG. 4 determines if it is time to perform a data update at operation 16. In embodiments in which each individual application controls their own power saving mode, operation 16 may be performed asynchronously by each application. An application may determine if it is time to perform a data update by comparing the current time (maintained by the operating system) with its next scheduled data update time, which was stored earlier at operation 14.

In embodiments in which the operating system controls updates for each application that is in a power saving mode, operation 16 is performed synchronously by the operating system for each active application. The operating system may determine if it is time to perform a data update for a given active application by querying a database for scheduled data updates (see operation 14) that occur at or before the current time. Based on this comparison, the operating system may create a list of applications that are scheduled to update data. Operation 16 repeats until at least one application or widget is to update its data. In one embodiment, operation 16 repeats at a set interval (e.g. every 5 seconds).

Upon the determination that an application or widget is to update its data now, operation 18 determines if the portable electronic device 1 is in a sleep state. As described above, the portable electronic device 1 is in a sleep state when the display screen is turned off. Conversely, when the display screen is turned on, the portable electronic device 1 is in a wake state. Operation 18 continues to operate until the portable electronic device 1 is determined to not be in a sleep state. In embodiments in which the operating system controls data updates for each application that is in a power saving mode, the method may return to operation 16 after operation 18 determines the portable electronic device 1 is in a sleep state. Returning to operation 16 allows the method to add additional applications to the list of applications that need to update their data "now".

In one embodiment, the device 1 determines that it is no longer in a sleep state when the operating system detects or receives a user command to exit the sleep state. For instance, a processor interrupt may be signaled by the home menu button being pressed. This would be followed with other operations that are more formally within the definition of wake state, such as turning on the display screen and enabling user input (e.g. alphanumeric text via a touch screen or via a physical keyboard) for unlocking the user interface of the device 1.

After determining that the portable electronic device 1 is not in a sleep state, operation 20 triggers the "now due" applications in its list to update their data. In embodiments in which the operating system controls data updates for each application that is in a power saving mode, the operating system sends an update message to the application to update its data. In response to the update message, the applications establish a connection with an external data source and then download its latest data. After updates have been completed at operation 20, the method may clear the list of applications that need to update their data now and returns to operation 16. The method continues to operate as long as a running application is in a power saving mode.

An example operation of the method of FIG. 4 will be described, while referring to various embodiments. FIGS. 5a-5d show a portable electronic device 1 performing the method of FIG. 4.

Figure 5A:
FIGS. 5a-5d show screen displays of the portable electronic device while the method of FIG. 4 is being performed.

FIG. 5a shows a lock screen of the portable electronic device 1 that is in a wake state at 12:00 PM. The lock screen includes a weather widget with a power saving mode selected, and a clock widget. The weather widget is scheduled to update every three hours. In this example, the weather widget has just updated and is scheduled to update again at 3:00 PM.

Figure 5B:
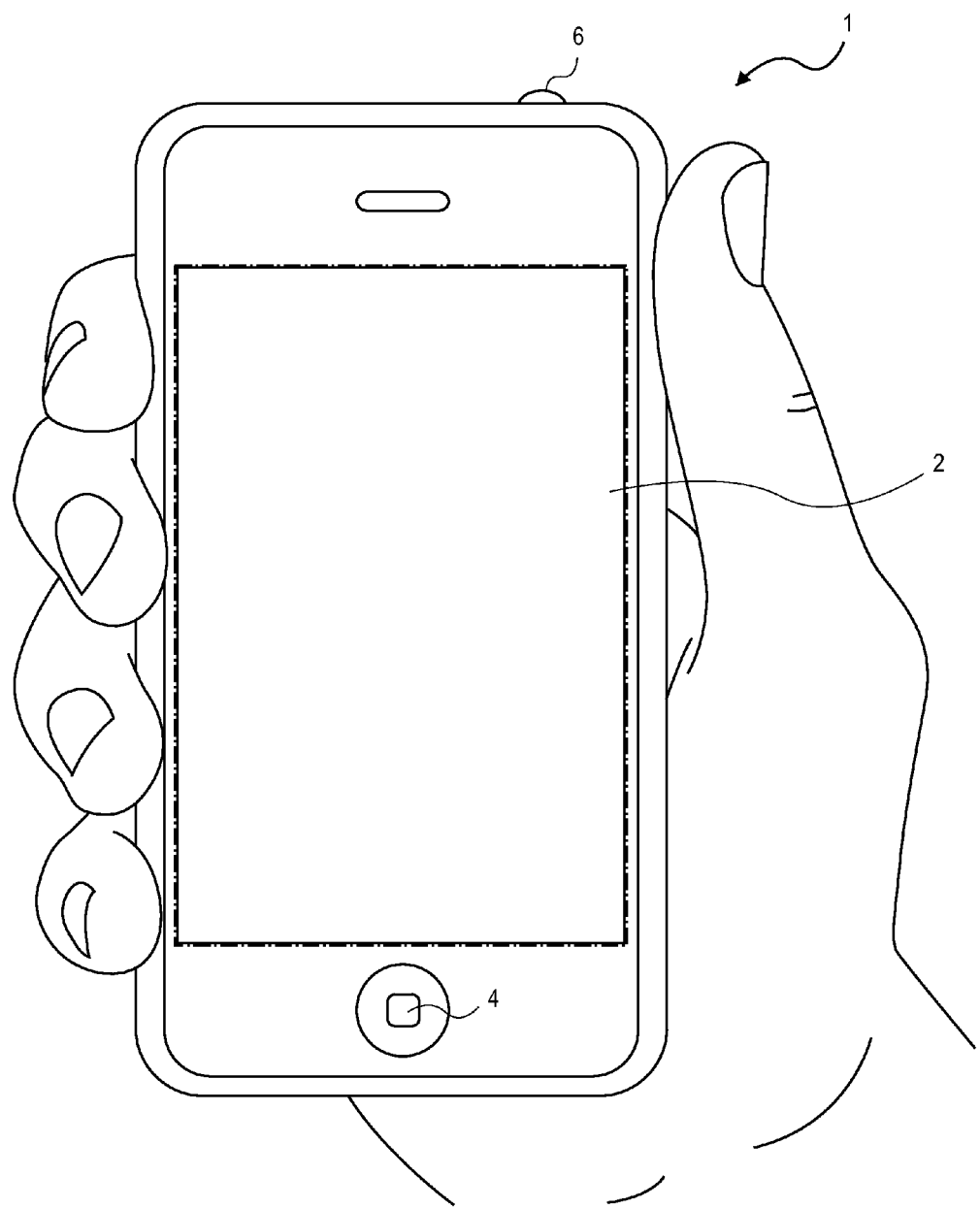

FIG. 5b shows the portable electronic device 1 in a sleep state at 12:01 PM. The device may enter the sleep state by pressing the power button for a short duration as explained above. Since the device 1 is in a sleep state, the lock screen and associated widget is not viewable on the display screen 2. Further any updates scheduled to take place while the portable electronic device 1 is in a sleep state, will not take place until the device 1 enters a wake state.

Figure 5C:

FIG. 5c shows the portable electronic device 1 at 4:00 PM immediately after entering a wake state for the first time since 12:00 PM. The portable electronic device 1 may enter a wake state by a user pressing either the power button 6 or home button 4, in response to which the display screen 2 is turned on. As seen in FIG. 5c, the weather data shown in the weather widget is identical to the weather data from FIG. 5a. The data is identical because as explained above no data updates were performed while the portable electronic device 1 was in a sleep state. Even though an update was scheduled for 3:00 PM, this update was rescheduled/delayed until after the portable electronic device 1 entered a wake state. Thus, in this embodiment, the display screen 2 is turned on without first updating any widgets that are visible in it, showing the original state of the widget from its previous update.

In one embodiment, the device 1 determines if the device is in a sleep state by accessing an application programming interface (API) provided by the operating system of the device. The sleep and wake states of the device 1 may be defined using a power management array. The first element in the array contains the structure that describes the sleep state and the second element of the array contains the structure that describes the wake state of the device 1. For example, the array and the corresponding structures may be defined in objective C as follows:

```
// Declare an array of two IOPMPowerState structures
(kMyNumberOfStates = 2).
    static IOPMPowerState myPowerStates[kMyNumberOfStates];
    // Zero-fill the structures.
    bzero (myPowerStates, sizeof(myPowerStates));
    // Fill in the information about the device's 1 sleep state:
    myPowerStates[0].version = 1;
    myPowerStates[0].capabilityFlags = kIOPMPowerOff;
    myPowerStates[0].outputPowerCharacter = kIOPMPowerOff;
    myPowerStates[0].inputPowerRequirement = kIOPMPowerOff;
    myPowerStates[0].screenPower = kIOPMPowerOff;
    // Fill in the information about the device's 1 wake state:
```

-continued

```
    myPowerStates[1].version = 1;
    myPowerStates[1].capabilityFlags = kIOPMPowerOn;
    myPowerStates[1].outputPowerCharacter = kIOPMPowerOn;
    myPowerStates[1].inputPowerRequirement = kIOPMPowerOn;
    myPowerStates[1].screenPower = kIOPMPowerOn;
```

The state of the device 1 may thereafter be determined by comparing the value in the power management array against the device's 1 current state. If the device 1 is determined to be in a wake mode, a data update is performed. An example function, which may be used by a widget or standalone application to update data, is shown below:

```
void MyIOServiceDriver::powerSavingDataUpdate (IOService *
whatDevice )
{
    if ( whatDevice.powerState == myPowerStates[1].screenPower) {
        // In wake state.
        performDataUpdate( );
    } else {
        // In sleep state.
        return;
    }
}
```

Figure 5D:

FIG. 5d shows the portable electronic device 1 a short period of time (less than a minute and in general on the order of a few seconds) after the display screen 2 was turned on (in FIG. 5c) wake state. The weather widget has performed its data update, which was originally scheduled for 3:00 PM and the data being displayed in the weather widget is now different from the original data shown in FIG. 5c.

Note that as an alternative, the display screen 2 could be turned on (in response to the home menu button 4 being pressed) but without the original state of the weather widget being displayed. In that case, there would be a short delay after the screen is turned on, while the weather widget updates its data, before its icon showing the updated data appears on the display screen 2.

Figure 6:
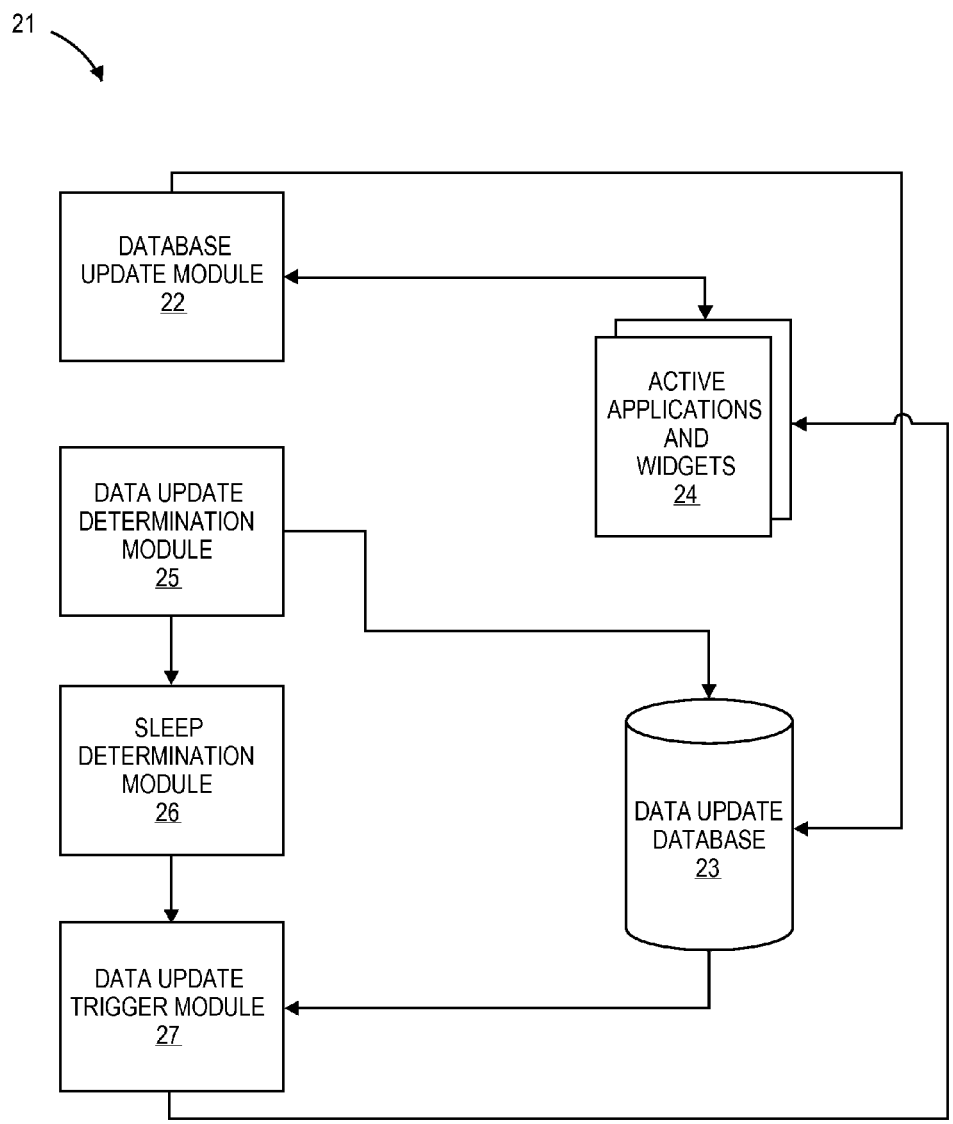
FIG. 6 shows a power saving data update system, in accordance with an embodiment of the invention.

Turning now to FIG. 6, a power saving data update system 21 will be described. The power saving data update system of FIG. 6 is capable of controlling multiple applications that may be running in a portable electronic device 1. As will be further described below, the power saving data update system may be used to perform the power saving update method of FIG. 4.

The power saving data update system 21 operates when at least one application has been selected to use a power saving mode. The applications may individually select to use a power saving mode through a user configuration panel provided by each application and widget. Alternatively, a global setting may be provided by the operating system, which requires all applications and widgets to use a power saving mode.

Upon selection of a power saving mode, the database management module 22 creates a data update database 23. The data update database 23 includes a listing of each active application and details of its respective next scheduled data update, e.g. time and date. The database management module 22 retrieves this information by sending a multicast request to each active application and widget 24.

After the creation of the data update database 23, the data update determination module 25 periodically queries the database 23 to determine if a scheduled data update is due for one or more active applications or widgets 24. The data update determination module 25 may determine a scheduled update is due by querying the data update database 23 for updates that are scheduled to occur on or before the current time. The data update determination module 25 may create a list of applications and widgets that are due to update data. The list may be separate from the data update database 23 or the list may be incorporated into the database 23 as a Boolean field. If no updates are due to occur, the data update module 25 retains control of the system 21 and continues to periodically query the data update database 23.

Upon determining that a scheduled update is due to occur, the sleep determination module 27 determines if the mobile electronic device 1 is in a sleep state. As described above, a sleep state is defined as the display screen 2 of the mobile electronic device 1 being turned off. If the mobile electronic device 1 is in a sleep state, the sleep determination module 27 passes control of the system back to the data update determination module 28.

Upon determining that the mobile electronic device 1 is not in a sleep state, the sleep determination module 27 passes control of the system 21 to the data update trigger module 28. The data update trigger module 28 receives a list of applications and widgets that are due to perform data updates. The list may be separate from the data update database 23 or the list may be incorporated into the database 23 as a Boolean field. Based on the list, the data update trigger module 28 triggers active applications and widgets 24 to update their data.

After triggering all listed applications and widgets, control of the system 21 passes back to the database management module 22. The database management module 22 updates the next scheduled update in the data update database 23 for each application and widget that has been updated.

To conclude, various aspects of a technique for updating data in applications and widgets running on a portable electronic device have been described. As explained above, an embodiment of the invention may be a machine-readable medium such as one or more solid state memory devices having stored thereon instructions which program one or more data processing components (generically referred to here as "a processor" or a "computer system") to perform some of the operations described above. In other embodiments, some of these operations might be performed by specific hardware components that contain hardwired logic. Those operations might alternatively be performed by any combination of programmed data processing components and fixed hardwired circuit components.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

What is claimed is:

1. A method for updating data in an application running on a portable electronic device, comprising:
   receiving a selection that places the application in a power savings mode, wherein the application is visible on a lock screen application that locks and unlocks a user interface of the portable electronic device, the application operates within a framework of the lock screen application, and the application shows the data from a source external to the portable electronic device;
   determining the portable electronic device is in a sleep state, wherein the application in the power savings mode is prevented from updating the data from the source external to the portable electronic device prior to the portable electronic device exiting the sleep state;
   receiving a command input to cause the portable electronic device to exit the sleep state based at least in part on whether the portable electronic device is in the sleep state; and
   scheduling an update to the data in the application at a time determined based at least in part on the received command input and a periodic update schedule for the application, wherein the determined time occurs after the portable electronic device has exited the sleep state.

2. The method of claim 1, further comprising:
   establishing a network connection between the portable electronic device and the source external to the portable electronic device at the determined time; and
   downloading data from the source external to the portable electronic device using the established network connection.

3. The method of claim 1, further comprising:
   creating a database of applications running on the portable electronic device and corresponding scheduled update times.

4. The method of claim 1, wherein the source external to the portable electronic device comprises an Internet data repository.

5. The method of claim 1, wherein the application comprises an application that is visible on a portion of the display screen of the portable electronic device.

6. The method of claim 1, wherein the lock screen application includes applications that show one or more of time, date, and battery charge status in addition to the data from the source external to the portable electronic device.

7. A non-transitory machine readable storage medium having stored instructions that program a portable electronic device to:
   receive a selection that places an application in a power savings mode, wherein the application is visible on a lock screen application that locks and unlocks a user interface of the portable electronic device, the application operates within a framework of the lock screen application, and the application shows data from a source external to the portable electronic device;
   determine the portable electronic device is in a sleep state, wherein the application in the power savings mode is prevented from updating the data in the application from the source external to the portable electronic device prior to the portable electronic device exiting the sleep state;
   receive a command input to cause the portable electronic device to exit the sleep state based at least in part on whether the portable electronic device is in the sleep state; and
   scheduling an update to the data in the application at a time determined based at least in part on the received command input and a periodic update schedule for the application, wherein the determined time occurs after the portable electronic device has exited the sleep state.

8. The non-transitory machine readable storage medium of claim 7, further comprising:
   creating a database of applications and corresponding scheduled update times.

9. The non-transitory machine readable storage medium of claim 8, further comprising:
   querying the database for applications with a next scheduled update time that is at or before a current time; and creating a list of applications with a next scheduled update time that is at or before the current time.

10. The non-transitory machine readable storage medium of claim 7, wherein the application comprises an application that is visible on a portion of the display screen of the portable electronic device.

11. A portable electronic device, comprising:
a processor;
a memory;
a program module, wherein the program module is stored in memory and configured to be executed by the processor, wherein the program module contains instructions to perform a method comprising:
receiving a selection that places an application in a power savings mode, wherein the application is visible on a lock screen application that locks and unlocks a user interface of the portable electronic device, the application operates within a framework of the lock screen application, and the application shows data from a source external to the portable electronic device;
determining the portable electronic device is in a sleep state, wherein the application in the power savings mode is prevented from updating the data in the application from the source external to the portable electronic device prior to the portable electronic device exiting the sleep state;
receiving a command input to cause the portable electronic device to exit the sleep state based at least in part on whether the portable electronic device is in the sleep state; and
scheduling an update to the data in the application at a time determined based at least in part on the received command input and a periodic update schedule for the application, wherein the determined time occurs after the portable electronic device has exited the sleep state.

12. A method comprising:
receiving, from a user of a portable electronic device, a selection that places an application in a power savings mode, wherein the application displays dynamic content on a lock screen application of the portable electronic device, the application operates within a framework of the lock screen application, and the application periodically updates the dynamic content from a source external to portable electronic device;
determining a display screen of the portable electronic device is in a screen off state, wherein the application is restricted from performing an update to the dynamic content as a result of the application being in the power savings mode; and
scheduling an update to the dynamic content for the application from the source external to portable electronic device at a time determined based at least in part on a command input to cause the portable electronic device to transition the display screen from the screen off state to a screen on state and a periodic update schedule for the application, wherein the determined time occurs after the portable electronic device has transitioned the display screen from the screen off state to the screen on state.

13. An electronic device, comprising:
a processor;
a memory;
a display screen;
a network interface; and
an operating system, wherein the operating system is stored in the memory and configured to be executed by the processor, wherein:
the operating system provides services to a set of applications executing on the operating system, the set of applications comprising a widget, the widget containing instructions to perform a method comprising:
displaying, on a lock screen of the device, dynamic content that is periodically updated from an external source using the network interface;
receiving, at a configuration panel for the widget, a first user selection that sets a time period between widget updates of the dynamic content; and
receiving, at the configuration panel, a second user selection that places the widget in power savings mode; and
the operating system contains instructions to perform a method comprising, while the widget is in power savings mode:
transitioning the display screen from a screen on state to a screen off state;
during a time period equal to the set time period, responsive to determining that the widget is in power savings mode, restricting the widget from performing at least one update to the dynamic content; and
responsive to the display screen transitioning from the screen off state to the screen on state, sending an update message to the widget, thereby causing the widget to update the dynamic content from the external source, wherein the widget accesses an application programming interface (API) provided by the operating system to determine a state of the display screen.

14. The electronic device of claim 13, wherein the set of applications comprises a second widget, the second widget containing instructions to perform a method comprising:
displaying, on the lock screen of the device, a second set of dynamic content that is periodically updated from a second external source using the network interface;
receiving, at a second configuration panel for the widget, a third user selection that sets a second time period between the second widget updates of the second set of dynamic content; and
receiving, at the second configuration panel, a fourth user selection that places the second widget in power savings mode.

15. The method of claim 1, further comprising:
sending a trigger message to the application to update the data in the application at the determined time.

16. The method of claim 3, further comprising:
storing the determined time in the database as a scheduled update time.

17. The method of claim 1, wherein the time is determined based at least in part on the application being in the power savings mode.

18. The method of claim 1, wherein the time is determined based at least in part on an update time in the periodic update schedule.

19. The method of claim 1, wherein the sleep state is defined in part by a display screen of the portable electronic device being off.

20. The non-transitory machine readable storage medium of claim 7, wherein the sleep state is defined in part by a display screen of the portable electronic device being off.

21. The portable electronic device of claim 11, wherein the sleep state is defined in part by a display screen of the portable electronic device being off.

* * * * *